US008530367B2

(12) United States Patent
Bouvier et al.

(10) Patent No.: US 8,530,367 B2
(45) Date of Patent: Sep. 10, 2013

(54) AGGLOMERATED ZEOLITIC ADSORBENTS, THEIR METHOD OF PREPARATION AND THEIR USES

(75) Inventors: Ludivine Bouvier, Billere (FR);
Stephane Kieger, Sartrouville (FR);
Catherine Laroche, Vernaison (FR);
Philibert Leflaive, Mions (FR);
Dominique Plee, Lons (FR)

(73) Assignees: CECA S.A., La Garenne Colombes (FR); IFP Energies Nouvelles, Rueil-Malmaison Cedex (FR)

( * ) Notice: Subject to any disclaimer, the term of this patent is extended or adjusted under 35 U.S.C. 154(b) by 927 days.

(21) Appl. No.: 12/374,124

(22) PCT Filed: Jul. 13, 2007

(86) PCT No.: PCT/FR2007/051661
§ 371 (c)(1),
(2), (4) Date: Oct. 13, 2009

(87) PCT Pub. No.: WO2008/009845
PCT Pub. Date: Jan. 24, 2008

(65) Prior Publication Data
US 2010/0113854 A1 May 6, 2010

Related U.S. Application Data

(60) Provisional application No. 60/858,630, filed on Nov. 13, 2006.

(30) Foreign Application Priority Data

Jul. 19, 2006 (FR) ...................................... 06 53033

(51) Int. Cl.
*B01J 29/06* (2006.01)
*B01J 20/00* (2006.01)
*C01B 39/00* (2006.01)
*C07C 7/13* (2006.01)

(52) U.S. Cl.
USPC .............. 502/64; 502/67; 502/69; 502/73; 502/79; 502/414; 423/700; 423/713; 585/826; 585/828; 585/831

(58) Field of Classification Search
USPC ............. 502/64, 67, 69, 73, 79, 407, 414; 423/700, 713; 585/826, 828, 831
See application file for complete search history.

(56) References Cited

U.S. PATENT DOCUMENTS

| 2,985,589 | A | 5/1961 | Broughton et al. |
| 3,119,660 | A | 1/1964 | Howell et al. |
| 3,558,730 | A | 1/1971 | Neuzil |
| 3,558,732 | A | 1/1971 | Neuzil |
| 3,626,020 | A | 12/1971 | Neuzil |
| 3,663,638 | A | 5/1972 | Neuzil |
| 3,878,127 | A | 4/1975 | Rosback |
| 3,960,774 | A | 6/1976 | Rosback |
| 4,402,832 | A | 9/1983 | Gerhold |
| 4,498,991 | A | 2/1985 | Orosker |
| 4,818,508 | A * | 4/1989 | Flank et al. .................. 423/712 |
| 5,064,630 | A | 11/1991 | Verduijn et al. |
| 5,284,992 | A | 2/1994 | Hotier et al. |
| 5,629,467 | A | 5/1997 | Hotier et al. |
| 6,183,539 | B1 | 2/2001 | Rode et al. |
| 6,410,815 | B1 * | 6/2002 | Plee et al. ..................... 585/828 |
| 6,616,732 | B1 * | 9/2003 | Grandmougin et al. .......... 95/96 |
| 6,806,219 | B2 * | 10/2004 | Masini et al. ................... 502/79 |
| 6,884,918 | B1 * | 4/2005 | Plee et al. ..................... 585/828 |
| 7,452,840 | B2 * | 11/2008 | Plee et al. ....................... 502/64 |
| 2002/0031472 | A1 * | 3/2002 | Masini et al. ................. 423/700 |
| 2002/0170947 | A1 * | 11/2002 | Igarashi et al. ............... 228/260 |
| 2005/0272594 | A1 * | 12/2005 | Weston et al. .................. 502/64 |
| 2008/0156190 | A1 | 7/2008 | Lutz et al. |

FOREIGN PATENT DOCUMENTS

JP 05-163015 6/1993

OTHER PUBLICATIONS

"Primary Analysis on State of Xylene Adsorption Unit", Xihong, L. et al., Speciality Petrochemicals, pp. 54-55, Jun. 2004.
"Principles of Adsorption and Adsorption Processess", Ruthven, D.M., pp. 242-255, 326-329 and 406-407, 1984.

* cited by examiner

*Primary Examiner* — Elizabeth Wood
(74) *Attorney, Agent, or Firm* — Smith, Gambrell & Russell, LLP

(57) ABSTRACT

The present invention relates to agglomerated zeolitic adsorbents based on zeolite X with an Si/Al ratio such that 1.15<Si/AL<1.5, consisting of crystals with a mean diameter of 1.7 mm or less and of an inert binder, at least 90% of the exchangeable cationic sites of the zeolite X being occupied by barium ions. They may be obtained by agglomerating a zeolite X powder having a mean diameter of 1.7 mm or less with a binder, followed by zeolitization of the binder, exchange of the zeolite ions with barium (and potassium) ions and activation of the adsorbents thus exchanged. These adsorbents exhibit, simultaneously, excellent selectivity, reduced mass transfer resistance and excellent mechanical strength and are particularly suitable for the adsorption of the paraxylene contained in C8 aromatic hydrocarbon fractions in liquid phase in processes of the simulated moving bed type and especially for the separation of paraxylene of C8 aromatic hydrocarbon fractions by adsorption, but also for the separation of sugars, polyhydric alcohols, cresols, and substituted toluene isomers.

25 Claims, No Drawings

AGGLOMERATED ZEOLITIC ADSORBENTS, THEIR METHOD OF PREPARATION AND THEIR USES

CROSS-REFERENCE TO RELATED APPLICATIONS

This application is a 371 national phase entry of PCT/FR2007/051661, filed 13 Jul. 2007, and claims the benefit of U.S. Patent Application Ser. No. 60/858,630, filed 13 Nov. 2006, and the benefit of priority to FR 06.53033, filed 19 Jul. 2006.

TECHNICAL FIELD

The invention relates to agglomerated zeolitic adsorbents based on zeolite X in small crystal form and exchanged with barium, or based on zeolite X in small crystal form and exchanged with barium and with potassium.

These adsorbents may be used more particularly for the production of very pure para-xylene from an aromatic hydrocarbon feed containing isomers having 8 carbon atoms.

PRIOR ART

The use of zeolitic adsorbents consisting of zeolites X or Y exchanged with ions such as barium, potassium or strontium ions, by themselves or as a mixture, in order to selectively adsorb para-xylene in an aromatic hydrocarbon mixture is well known in the prior art.

U.S. Pat. No. 3,558,730, U.S. Pat. No. 3,558,732, U.S. Pat. No. 3,626,020 and U.S. Pat. No. 3,663,638 show that adsorbents comprising aluminosilicates exchanged with barium and potassium, or with barium alone (U.S. Pat. No. 3,960,774) are effective for separating para-xylene from an aromatic $C_8$ fraction.

A method for producing these adsorbents is for example described in U.S. Pat. No. 3,878,127 and consists of a hot sodium hydroxide treatment of agglomerates (zeolite X+binder) with an $Na_2O/Al_2O_3$ ratio strictly less than 0.7 so as to replace the exchangeable cations of the zeolite (such as protons or cations of group HA) with sodium prior to a barium or (barium+potassium) exchange, the prior exchange with sodium making it possible for a larger quantity of barium or (barium+potassium) ions to be added to the zeolitic structure.

These adsorbents are used as adsorption agents in liquid-phase processes, preferably of the simulated counter-current type similar to those described in U.S. Pat. No. 2,985,589, which are applied inter alga to $C_8$ aromatic fractions (fractions comprising aromatic hydrocarbons containing 8 carbon atoms).

In the references listed above, the zeolitic adsorbents are in the form of powder or in the form of agglomerates predominantly consisting of zeolite and up to 15 to 20% by weight of inert binder.

The synthesis of X-zeolites, usually by nucleation and crystallization of aluminosilicate gels, results in powders that are particularly difficult to use on an industrial scale (significant head losses during handling) and agglomerated forms are preferred, in the form of granules or particles that do not have the drawbacks inherent in pulverulent materials.

These agglomerates, whether in the form of wafers, beads or extrudates, generally consist of a zeolite powder, which constitutes the active element (within the context of adsorption) and of a binder intended to provide cohesion of the crystals in the form of particles and to give the particles sufficient mechanical strength to withstand the vibrations and movements to which they are subjected during their processing.

These agglomerates are produced for example by pasting a zeolite powder with a clay paste, in proportions of around 80 to 85% by weight of zeolite power per 20 to 15% by weight of binder, then by forming beads, wafers or extrudates, and high-temperature heat treatment in order to fire the clay and reactivate the zeolite, it being possible for the barium exchange to be carried out before and/or after agglomeration of the pulverulent zeolite with the binder.

Zeolitic bodies having a particle size of a few millimetres are obtained and if the binder is chosen and the granulation carried out according to the rules of the art, said zeolitic bodies exhibit a number of satisfactory properties, particularly porosity, mechanical strength and abrasion resistance. However, the adsorption properties of these agglomerates are obviously reduced compared with the active starting powder owing to the presence of the inert agglomerating binder.

Various means have been proposed for alleviating this drawback of the binder being inert with respect to the adsorbent performance, among which is the conversion of the binder, completely or partly, into a zeolite or zeolitization. In order for this operation to be carried out easily, zeolitizable binders belonging to the family of kaolinite, calcined beforehand at temperatures between 500° C. and 700° C., are used.

A variant consists in moulding kaolin particles and then in zeolitizing the kaolin. This principle is expounded in "*Zeolite Molecular Sieves*" by D. W. Breck, John Wiley & Sons, New York, p. 320 et seq. This technology has been successfully applied to the formation of particles of zeolite A or zeolite X, consisting of up to 95% by weight of the zeolite itself and a residue of unconverted binder (see for example U.S. Pat. No. 3,119,660 in which it may be noted that the zeolite X formation requires the addition of a source of silica in the reaction medium).

In U.S. Pat. No. 4,818,508, agglomerates based on zeolite A, zeolite X or zeolite Y are produced by digesting reactive clay performs (the clay being obtained by heat treatment of an unreactive clay—such as halloysite or kaolinite—at least 50% by weight of which is in the form of particles having a size between 1.5 and 15 µm), preferably in the presence of a pore-forming agent and with an alkali metal oxide. The examples relating to the synthesis of agglomerates based on zeolite X show again that it is necessary to add a source of silica, which is not the case for producing agglomerates based on zeolite A. However, this process does not make it possible a priori to control the size of the zeolite crystals formed after digesting the reactive clay.

JP 05163015 teaches that it is possible to form particles of zeolite X with a low Si/Al ratio, of less than 1.25, by mixing an LSX zeolite powder having an Si/Al ratio of less than 1.25 with kaolin, potassium hydroxide, sodium hydroxide and carboxymethylcellulose, followed by an extrusion forming operation. The particles thus obtained are dried, calcined at 600° C. for 2 hours and then immersed in a sodium hydroxide/potassium hydroxide solution at 400° C. for 2 days.

However, the associated processes described in the above patents are tedious and have shortcomings, either through the excessive duration of the reaction or through the large number of steps involved. According to the inventors, it may also be feared that the heat treatment as described and claimed in JP 05163015, after the forming step, could contribute to amorphization of the particles and that the caustic digestion that follows would recrystallize them, which would explain the slowness of the process.

FR 2 789 914 describes a process for manufacturing agglomerates of zeolite X with an Si/Al ratio such that 1.15<Si/Al≦1.5, exchanged with barium and optionally with potassium, as an agglomerate of the zeolite X powder with a binder, a silica source and carboxymethylcellulose, and then by zeolitizing the binder by immersing the agglomerate in an alkaline liquor. After ion exchange of the zeolite with barium (and potassium) ions and activation, the agglomerates thus obtained have properties of adsorbing para-xylene contained in aromatic fractions that are superior to adsorbents produced from the same quantity of zeolite X and binder, but the binder of which is not zeolitized.

Apart from good selectivity properties, with respect to the species to be separated from the reaction mixture, the adsorbent must have good mass transfer properties so as to guarantee a number of adsorption trays sufficient to carry out effective separation of the species in the mixture, as indicated by Ruthven in the work entitled "*Principles of Adsorption and Adsorption Processes*", pages 326 and 407. On page 243, Ruthven indicates that, in the case of an agglomerated adsorbent, the overall mass transfer depends additionally on the intra-crystalline diffusion resistance and on the diffusion resistance between crystals. The intra-crystalline diffusion resistance is proportional to the square of the crystal radii and inversely proportional to the diffusivity of the intra-crystalline molecules. The diffusion resistance between crystals (also called the macroporous resistance) is itself proportional to the square of the radii of agglomerates and inversely proportional to the diffusivity of the molecules in the macropores. For a zeolitic structure with a given agglomerate size and a given operating temperature, the diffusivities are fixed and the only means of improving mass transfer consists in reducing the diameter of the crystals. The overall transfer will therefore be increased by reducing the size of the crystals.

To estimate this improvement in the transfer kinetics, the tray theory described by Ruthven in "*Principles of Adsorption and Adsorption Processes*", chapter 8, pages 248-250 may be used. This approach is based on a column being represented by a finite number of ideally agitated hypothetical reactors (theoretical stages). The equivalent height of a theoretical tray is a direct measure of the axial dispersion and of the mass transfer resistance of the system.

In the particular case of gas purification, the prior art (EP1 105 213) has demonstrated that a reduction in the size of the crystals increases the adsorptivity in dynamic operation and reduces the intra-crystalline diffusion resistance. For this purpose, EP 1 105 213 describes a process for manufacturing a molecular sieve for eliminating $CO_2$. This molecular sieve is formed by agglomerating a faujasite X powder with a low Si/Al ratio (LSX), more than 97% of the cationic sites of which are occupied by sodium ions, with an inert binder, a peptizing agent and pore-forming agent. Furthermore, more than 80% of said LSX powder must consist of crystals having a size between 1 and 2 µm so as to improve the dynamic $CO_2$ adsorptivity and to reduce the intra-crystalline transfer resistance.

A third property of the adsorbent necessary for guaranteeing good performance of the liquid-phase separation process of the simulated counter-current type is to have a good mechanical strength. This is because, under standard conditions of operating this type of process, a mechanical stress is applied to the adsorbent within the units, resulting in the formation of fines, causing the performance to deteriorate ("*Primary analysis on state of xylene adsorption unit*" by Li at al., Jingxi Shiyou Huagong, 2004 (4), 54-55) and the more so when the mechanical strength of the adsorbent is low.

The mechanical strength of adsorbents is characterized using a "BCS tester" instrument sold by Vinci Technologies using the method (supplied with the device) called SMS (Shell Method Series) 1471-74 "*Determination of bulk crushing strength of catalysts; compression-sieve method*") which allows the crushing strength of a bed of solids (beads or extrudates with a length of 6 mm or less) to be determined.

It is known that agglomerated zeolitic adsorbents based on zeolite X exchanged with barium or with (barium+potassium) exhibit good xylene adsorption properties, good selectivity for p-xylene in a mixture of $C_8$ aromatics in liquid phase.

It is also known that small zeolite crystals generally provide better mass transfer than crystals of the same zeolite but larger in size, in particular owing to the improved mass transfer.

A person skilled in the art therefore would expect that agglomerated zeolite adsorbents based on zeolite X consisting of small crystals and exchanged with barium or with (barium+potassium) would exhibit good p-xylene adsorption properties, good selectivity and good mass transfer and would therefore expect such adsorbents to exhibit good initial performance in separating the para-xylene contained in a mixture of $C_8$ aromatics in a liquid-phase process, for example of the simulated counter-current type.

However, the inventors have found that zeolitic adsorbents based on zeolite X consisting of small crystals agglomerated with a binder in a conventional manner do not have good mechanical strength and that their performance in separating $C_8$ aromatic isomers, and especially xylenes, deteriorates over the course of time, and does so more quickly the smaller the size of the zeolite X crystals.

SUMMARY OF THE INVENTION

The subject of the present invention is zeolitic adsorbents having improved properties for separating para-xylene from a mixture of $C_8$ aromatics, while remedying the problem of loss of mechanical strength. The agglomerated zeolitic adsorbents exhibit good selectivity properties with respect to para-xylene, good mass transfer and good mechanical strength, and are particularly suitable for use in a process for separating para-xylene in liquid phase, preferably of the simulated counter-current type.

The agglomerated zeolitic adsorbents according to the present invention comprise: zeolite X crystals with a diameter of 1.7 µm or less, preferably ranging from 0.1 to 1.7 µm and advantageously ranging from 0.1 à 1.6 µm, an Si/Al atomic ratio such that 1.15<Si/Al≦1.5, preferably ranging from 1.2 to 1.3, exchanged to at least 90% by barium ions alone or by barium ions and potassium ions, it being possible for the exchangeable sites occupied by potassium to represent up to ⅓ of the exchangeable sites occupied by barium+potassium (the possible balance generally being provided by ions of alkali metals or alkaline-earth metals other than barium), and an inert binder, and are characterized in that their Dubinin volume measured by nitrogen adsorption at 77 K after vacuum degassing at 300° C. for 16 hours, is 0.245 cm³/g, preferably 0.250 cm³/g or higher and advantageously 0.253 cm³/g or higher, and their mechanical strength, measured using a "BCS tester" instrument sold by Vinci Technologies using the Shell Method Series SMS1471-74 adapted for zeolitic agglomerates having a size of less than 1.6 mm, is 2 MPa or higher.

The invention also relates to a process for producing agglomerates according to the invention, which comprises the following steps:

a) agglomeration of zeolite X powder with a diameter of 1.7 µm or less, preferably ranging from 0.1 to 1.7 µm and advantageously ranging from 0.6 to 1.6 µm, with a binder containing at least 80% by weight of zeolitizable clay and optionally a source of silica, forming, then drying and calcination;

b) zeolitization of the binder by the action of an alkaline basic solution;

c) replacement of at least 90% of the exchangeable sites of the zeolite X with barium, followed by washing and drying of the product thus treated;

d) optional replacement of at most 33% of the exchangeable sites of the zeolite X with potassium, followed by washing and drying of the product thus treated; and e) activation.

The size of the zeolite X crystals used in step a) and of the crystals of zeolite X contained in the agglomerates is measured by scanning electron microscopy (SEM).

SEM microscopy also makes it possible to confirm the presence of inert binder within the agglomerates.

The crystals of zeolite X with a diameter of less than 1.7 µm employed within the context of the present invention are considered as small crystals—commercial crystals of zeolite X most commonly used have in general a diameter greater than 2 µm.

The agglomeration and forming (step a)) may be carried out using any technique known to those skilled in the art, such as extrusion, compacting, agglomeration. The proportions of binder and zeolite used are typically those of the prior art, that is to say 5 to 99 parts by weight of binder per 95 parts to 1 part by weight of zeolite. The agglomerates resulting from step a), whether they are in the form of beads, or extrudates, generally have a number-average diameter ranging from 0.4 to 2 mm, and in particular between 0.4 and 0.8 mm.

In the present document, the expression "number-average diameter" or "size" is used for the zeolite crystals and for the zeolitic agglomerates. The measurement precision is around 3%

After step a), the finest agglomerate particles may be removed, by cycloning and/or screening, and/or the coarsest particles may be removed by screening and/or crushing, for example in the case of extrudates.

The agglomerating binder employed in step a) contains at least 80% by weight of zeolitizable clay and may also contain other mineral binders, such as bentonite or attapulgite. The term "zeolitizable clay" is understood to mean a clay or a mixture of clays capable of being converted into a zeolitic material by the action of an alkaline basic solution. The zeolitizable clay generally belongs to the family of kaolins, kaolinites, nacrites, dickites, halloysites and/or metakaolins. Kaolin is commonly used.

The zeolite X powder employed in step a) may result from synthesizing crystals of sodium-exchanged zeolite X, also called NaX or 13 X zeolite, but it would not be outside the scope of the invention to use a powder that has undergone one or more cationic exchanges between synthesis in NaX form and its use in step a).

The optional source of silica may be colloidal silica, silicate, diatomaceous earths, perlite, fly ash, sand or any other type of solid silica.

During step a), apart from the zeolite X powder and the binder, additives may also be used, for example additives intended to make it easier to agglomerate or to improve the hardening of the agglomerates formed.

The calcination, which follows the drying, is carried out at a temperature generally between 500 and 600° C.

Thanks to zeolitization step b), at least 50% of the zeolitizable inert binder is converted to zeolitic material. The aim of the zeolitization is in particular to increase the mechanical strength of the agglomerated zeolitic adsorbents. The zeolitization may be carried out by immersing the agglomerate in an alkaline basic solution, in general an aqueous solution, for example an aqueous sodium hydroxide and/or potassium hydroxide solution, the concentration of which is preferably greater than 0.5M. This operation is preferably carried out hot (at temperatures above room temperature) typically at temperatures of around 80-100° C., so as to improve the process kinetics and reduce the immersion times to less than 8 hours, but it would not be outside the scope of the invention to carry out the operation at lower temperatures and for longer immersion times. According to this operating method, zeolitization (i.e. conversion of the adsorption-inert binder into adsorption-active material) of at least 50% by weight of the binder is readily achieved. The material is then washed with water before being dried.

Step c) of exchanging the cations of the zeolite with barium takes place by bringing the agglomerates obtained from step b) (or d)) into contact with a barium salt, such as $BaCl_2$, in aqueous solution at a temperature between room temperature and 100° C., and preferably between 80 and 100° C. To obtain a high degree of barium exchange, i.e. greater than 90%, rapidly, it is preferred to operate with a large excess of barium relative to the cations of the zeolite that it is desired to exchange, typically such that the $BaO/Al_2O_3$ ratio is around 10 to 12, and by carrying out successive exchanges so as to achieve the intended minimum degree of exchange of at least 90%, preferably at least 95%. Throughout this text, the levels of exchange are calculated in equivalents and not in terms of molarity.

The optional exchange with potassium (step d)) may be carried out before and/or after barium exchange (step c)) and/or simultaneously, using a solution containing barium ions and potassium ions. As indicated above, it is also possible in step a) to agglomerate the zeolite X powder already containing potassium ions (by pre-exchanging the NaX zeolite with potassium ions before step a)) and dispensing (or not) with step d).

The purpose of the activation (step e)), the final step of the process for obtaining the adsorbents according to the invention, is to fix the water content and the loss on ignition of the adsorbent within optimum limits. This step is in general a thermal activation, preferably carried out between 200 and 300° C. for a certain time, depending on the desired water content and the desired loss on ignition, typically 1 to 6 hours.

The agglomerates resulting from step e), whether they are in bead or extrudate form, generally have a number-average diameter ranging from 0.4 to 2 mm, and in particular between 0.4 and 0.8 mm.

The invention also relates to the uses of the zeolitic adsorbents described above as adsorption agents capable of advantageously replacing the adsorption agents described in the literature based on zeolite X exchanged with barium or based on zeolite X exchanged with barium and potassium, and especially in the uses listed below:

\*separation of $C_8$ aromatic isomers, and especially xylenes;

\*separation of sugars;

\*separation of polyhydric alcohols;

\*separation of substituted toluene isomers, such as nitrotoluene, diethyltoluene and toluenediamine; and \*separation of cresols.

The invention relates in particular to an improved method of recovering para-xylene from $C_8$ aromatic isomer fractions consisting in using, as agent for adsorbing the p-xylene, a zeolitic adsorbent according to the invention employed in liquid-phase processes but also in gas-phase processes.

The desired product may thus be separated by preparative adsorption liquid chromatography (in batch mode), advantageously simulated moving bed liquid chromatography, that is to say of the simulated counter-current or simulated co-current type, and more particularly simulated counter-current type.

The operating conditions for an industrial adsorption unit of the simulated counter-current type are in general the following:

number of beds: 6 to 30;
number of zones: at least 4;
temperature: 100 to 250° C., preferably 150 to 190° C.;
pressure: between the bubble pressure of xylenes at a temperature of the process and 3 MPa;
ratio of desorbent rate to feed rate: 0.7 to 2.5 (for example 0.9 to 1.8 for a stand-alone adsorption unit and 0.7 to 1.4 for an adsorption unit combined with a crystallization unit); and
recycling rate: 2.5 to 12, preferably 3.5 to 6.

The reader may refer to the teaching of U.S. Pat. No. 2,985,589, U.S. Pat. No. 5,284,992 and U.S. Pat. No. 5,629,467.

The operating conditions of an industrial simulated co-current adsorption unit are, in general the same as those operating in simulated counter-current mode except for the recycling rate, which is generally between 0.8 and 7. The reader may refer to U.S. Pat. No. 4,402,832 and U.S. Pat. No. 4,498,991.

The desorption solvent may be a desorbent whose boiling point is below that of the feed, such as toluene, but also a desorbent whose boiling point is above that of the feed, such as para-diethylbenzene (PDEB). The selectivity of the adsorbents according to the invention for adsorbing p-xylene contained in $C_8$ aromatic fractions is optimum when the loss on ignition measured at 900° C. is in general between 4.0 and 7.7%, preferably between 4.7 and 6.7%. Water and a little carbon dioxide are included in the loss on ignition.

One of the techniques of choice for characterizing the adsorption of molecules in liquid phase on a porous solid is breakthrough. In his work *"Principles of Adsorption and Adsorption Processes"*, Ruthven defines the technique of breakthrough curves as a way of studying the injection of a range of adsorbable constituents.

The SMS1471-74 method (Shell Method Series *"Determination of bulk crushing strength of catalysts: compression-sieve method"*) associated with the "BCS Tester" instrument sold by Vinci Technologies makes it possible to determine the crushing strength of a bed of solids and is based on the following principle: a 20 cm³ specimen of agglomerated adsorbents, dried beforehand in an oven for at least 2 hours at 250° C., is placed in a metal cylinder of known internal section. An increasing force is imposed on this specimen in steps by means of a piston. The fines obtained at the various pressure steps are separated by screening and weighed. The screen used in the standard Shell method is a 425 µm screen, which must be adapted for agglomerates smaller in size than 1.6 mm for which a 200 µm screen is used. The crushing strength in bed form is determined by the pressure in megapascals (MPa) for which the cumulative amount of fines passing through the sieve amounts to 0.5% by weight of the specimen. This value is obtained by plotting on a graph the mass of fines obtained as a function of the force applied to the bed of adsorbent and by interpolating to 0.5% by weight of cumulative fines. The crushing resistance of the bed is typically between a few hundred kPa and a few tens of MPa, generally between 0.3 and 3.2 MPa.

Ways of Implementing the Invention

A—Synthesis of Zeolite X Crystals Having an Si/Al Ratio of 1.25±0.03, a Diameter of 2.1 µm and an Na/Al Ratio of 1

A gel having the following molar composition:

2.72 $Na_2O$; 2.8 $SiO_2$; $Al_2O_3$; 150$H_2O$ is prepared by mixing the following reactants: sodium hydroxide silicate, sodium aluminate and water by means of a turbine mixer. The gel is left to mature at 35° C. for 20 hours and then is crystallized for 4 hours at 100° C.

The crystals obtained after filtering and washing are identified by X-ray diffraction as faujasites.

Chemical analysis of the solid gives an Si/Al ratio of 1.25±0.03.

Analysis of the zeolite crystal size is carried out by scanning electron microscopy—their average size is 2.1 µm.

B—Synthesis of Zeolite X Crystals Having an Si/Al Ratio of 1.25±0.03, a Diameter of 1.6 µm and an Na/Al Ratio of 1

A gel having the following molar composition:

3.2 $Na_2O$; 2.8 $SiO_2$; $Al_2O_3$; 130$H_2O$ is prepared by mixing the following reactants: sodium hydroxide silicate, sodium aluminate and water by means of a turbine generator. The gel is left to mature at 35° C. for 20 hours before being crystallized for 4 hours at 100° C.

The crystals obtained after filtering and washing are identified by X-ray diffraction as faujasites.

Chemical analysis of the solid gives an Si/Al ratio of 1.25±0.03.

Analysis of the zeolite crystal size is carried out by scanning electron microscopy—their average size is 1.6 µm.

EXAMPLE 1

Comparative 840 g (expressed as calcined equivalent) of zeolite powder prepared using the operating method described in A were agglomerated by intimately mixing it with 160 g of Charentes kaolinite (expressed as calcined equivalent) with a suitable amount of water in order to form agglomerates by extrusion. The extrudates were dried, crushed so as to recover the particles, which had an equivalent diameter of 0.7 mm, and then calcined at 550° C. in a stream of nitrogen for 2 h.

These granules were exchanged by means of a 0.5M barium chloride solution at 95° C. in 4 steps. At each step, the volume of solution to mass of solid ratio was 20 ml/g and the exchange was continued for 4 hours each time. Between each exchange, the solid was washed several times so as to strip it of excess salt. It was then activated at a temperature of 250° C. for 2 h in a stream of nitrogen.

The degree of barium exchange was 97% and the loss on ignition (measured at 900° C.) was 5.9%. The micropore volume measured using the Dubinin method by nitrogen adsorption at 77 K after vacuum degassing at 300° C. for 16 h was 0.23 cm³/g.

A breakthrough test (frontal chromatography) was then carried out on these adsorbents in order to determine their effectiveness. The amount of adsorbent used for this test was about 81 g.

The operating method for obtaining the breakthrough curves was the following:

filling of the column with the sieve and placing the column in the test rig;
filling with the solvent at room temperature;
progressive rise in the adsorption temperature under a stream of solvent (5 cm³/min);

injection of solvent at 10 cm³/min when the adsorption temperature is reached;

solvent/charge permutation for injecting the charge (10 cm³/min);

injection of the charge then maintained for a time long enough to reach thermodynamic equilibrium; and collection and analysis of the breakthrough effluent.

The pressure was sufficient for the charge to remain in liquid phase, i.e. 1 MPa. The adsorption temperature was 175° C.

The composition of the charge was the following:
para-xylene: 45% by weight;
meta-xylene: 45% by weight; and
isooctane: 10% by weight (the latter was used as tracer for estimating the non-selective volumes and is not involved in the separation).

The breakthrough results are given in the table below:

The selectivity of para-xylene relative to meta-xylene is calculated by mass balance.

| Nature of the solid | LOI[1] at 900° C. | Temp[2] | Capacity[3] | $\alpha_{pX/mX}$ selectivity[4] | Theoretical tray height |
|---|---|---|---|---|---|
| BaX | 5.9% | 175° C. | 0.176 | 3.59 | 3.71 |

[1]LOI: loss on ignition;
[2]Temp.: adsorption temperature;
[3]Capacity is expressed in cm³ of C₈ aromatics adsorbed per gram of adsorbent;
[4]pX: para-xylene; mX: mete-xylene.

The mechanical strength was also measured using the method given in the description of the invention. The pressure needed to obtain 0.5% fines was 1.80 MPa.

EXAMPLE 2

Comparative 840 g (expressed as calcined equivalent) of NaX zeolite powder prepared using the operating method described in B were agglomerated by intimately mixing them with 160 g of kaolin (expressed as calcined equivalent) and the suitable amount of water for forming agglomerates by extrusion. The extrudates were dried, crushed so as to recover the particles, the equivalent diameter of which was 0.7 mm, and then calcined at 550° C. in a stream of nitrogen for 2 h.

The barium exchange was carried out under operating conditions identical to those of Example 1 except for the concentration of the BaCl₂ solution, which was 0.7M, followed by washing and then drying at 80° C. for 2 h and finally activation at 250° C. for 2 h in a stream of nitrogen.

The degree of barium exchange was 97% and the loss on ignition (measured at 900° C.) was 5.8%. The micropore volume measured using the Dubinin method by nitrogen adsorption at 77 K after vacuum degassing at 300° C. for 16 h was 0.235 cm³/g.

A breakthrough test (frontal chromatography) was then carried out on these adsorbents in order to determine their effectiveness. The amount of adsorbent used for this test was about 73 g.

The operating method and the composition of the charge were identical to those of Example 1.

The breakthrough results are given in the table below:

The selectivity of para-xylene relative to meta-xylene is calculated by mass balance.

| Nature of the solid | LOI[1] at 950° C. | Temp[2] | Capacity[3] | $\alpha_{pX/mX}$ selectivity[4] | Theoretical tray height |
|---|---|---|---|---|---|
| BaX | 5.8% | 175° C. | 0.173 | 3.59 | 2.20 |

The mechanical strength was also measured using the method given in the description of the invention. The pressure needed to obtain 0.5% fines was 1.65 MPa.

Compared with the results obtained with the adsorbent of Example 1, it may be seen that the mass transfer is considerably improved, the equivalent theoretical tray height being considerably reduced, but the mechanical strength has also been substantially reduced.

EXAMPLE 3

Comparative

In this example, an adsorbent according to the prior art (FR 2 789 914) was produced and tested.

An NaX zeolite with an Si/Al ratio of 1.25 and an Na/Al ratio of 1 was agglomerated by intimately mixing 800 g (expressed as calcined equivalent) of zeolite X powder prepared according to the operating method described in A, 150 g of kaolin (expressed as calcined equivalent) and 65 g of colloidal silica sold under the brand name Klebosol®30 (previously sold under the name Cecasol®30) (containing 30% by weight of SiO₂ and 0.5% of Na₂O) with the suitable amount of water for carrying out the extrusion. The extrudates were dried, crushed, so as to recover the particles, the equivalent diameter of which was 0.7 mm, and then calcined at 550° C. in a stream of nitrogen for 2 h.

200 g of granules thus obtained were placed in a glass reactor provided with a jacket regulated to a temperature of 100±1° C. and then 1.5 l of an aqueous sodium hydroxide solution of 100 g/l concentration was added and the reaction mixture was left with stirring for 3 h. Next, the granules were washed in three successive washing operations with water, followed by draining of the reactor. The effectiveness of the washing was checked by measuring the final pH of the washing waters, which was between 10 and 10.5.

Next, a barium exchange was carried out under operating conditions identical to those of Example 2 followed by washing and then drying at 80° C. for 2 h and finally activation at 250° C. for 2 h under a stream of nitrogen. The degree of barium exchange of this adsorbent was 95% and its loss on ignition was 6.0%. The micropore volume measured using the Dubinin method by nitrogen adsorption at 77 K after vacuum degassing at 300° C. for 16 h was 0.25 cm³/g.

A breakthrough test (frontal chromatography) was carried out in order to determine the effectiveness of the adsorbent prepared under the operating conditions described above. The amount of sieve used for these tests was about 77 g.

The operating mode and the composition of the charge were identical to those of Example 1.

The breakthrough results are given in the table below:

The selectivity of para-xylene relative to meta-xylene was calculated by mass balance.

| Nature of the solid | LOI[1] at 900° C. | Temp[2] | Capacity[3] | $\alpha_{pX/mX}$ selectivity[4] | Theoretical tray height |
|---|---|---|---|---|---|
| BaX | 6.0% | 175° C. | 0.199 | 3.41 | 3.45 |

The pressure that had to be applied in order to obtain 0.5% fines was 2.60 MPa.

EXAMPLE 3a

Comparative

In this example, an adsorbent according to the prior art (Example 2 of FR 2 789 914 reproduced identically) was produced and tested.

An NaX zeolite with an Si/Al ratio of 1.25 and an Na/Al ratio of 1 was agglomerated by intimately mixing 800 g (expressed as calcined equivalent) of zeolite X powder prepared according to the operating method described in A, 150 g of kaolin (expressed as calcined equivalent), 56 g of colloidal silica sold under the brand name Klebosol®30 (previously sold under the name Cecasol®30) (containing 30% by weight of $SiO_2$ and 0.5% of $Na_2O$) and 6 g of carboxymethylcellulose with the suitable amount of water for carrying out the extrusion. The extrudates were dried, crushed, so as to recover the particles, the equivalent diameter of which was 0.7 mm, and then calcined at 550° C. in a stream of nitrogen for 2 h.

200 g of granules thus obtained were placed in a glass reactor provided with a jacket regulated to a temperature of 100±1° C. and then 1.5 l of an aqueous sodium hydroxide solution of 100 g/l concentration was added and the reaction mixture was left with stirring for 3 h. Next, the granules were washed in three successive washing operations with water, followed by draining of the reactor. The effectiveness of the washing was checked by measuring the final pH of the washing waters, which was between 10 and 10.5.

Next, a barium exchange was carried out under operating conditions identical to those of Example 2 followed by washing and then drying at 80° C. for 2 h and finally activation at 250° C. for 2 h under a stream of nitrogen. The degree of barium exchange of this adsorbent was 97.4% and its loss on ignition was 5.2%. The micropore volume measured using the Dubinin method by nitrogen adsorption at 77 K after vacuum degassing at 300° C. for 16 h was 0.244 $cm^3/g$.

A breakthrough test (frontal chromatography) was carried out in order to determine the effectiveness of the adsorbent prepared under the operating conditions described above. The amount of sieve used for these tests was about 77 g.

The operating mode and the composition of the charge were identical to those of Example 1.

The breakthrough results are given in the table below:

The selectivity of para-xylene relative to meta-xylene was calculated by mass balance. The results are different from those indicated in Example 2 of FR 2 789 914, given that the test method is different.

| Nature of the solid | $LOI^{(1)}$ at 900° C. | $Temp^{(2)}$ | $Capacity^{(3)}$ | $\alpha_{pX/mX}$ $selectivity^{(4)}$ | Theoretical tray height |
|---|---|---|---|---|---|
| BaX | 5.2% | 175° C. | 0.194 | 3.35 | 3.89 |

The pressure that had to be applied in order to obtain 0.5% fines was 2.55 MPa.

EXAMPLE 4

According to the Invention 800 g (expressed as calcined equivalent) of NaX zeolite powder prepared using the operating method described in B, were intimately mixed and agglomerated with 150 g of kaolin (expressed as calcined equivalent) and 65 g of colloidal silica sold under the brand name Klebosol®30 (previously sold under the name Cecasol®30) (containing 30% by weight of $SiO_2$ and 0.5% of $Na_2O$) with the suitable amount of water for carrying out the extrusion. The extrudates were dried, crushed, so as to recover the particles, the equivalent diameter of which was 0.7 mm, and then calcined at 550° C. in a stream of nitrogen for 2 h.

200 g of granules thus obtained were placed in a glass reactor provided with a jacket regulated to a temperature of 100±1° C. and then 1.5 l of an aqueous sodium hydroxide solution of 100 g/l concentration was added and the reaction mixture was left with stirring for 3 h. Next, the granules were washed in three successive washing operations with water, followed by draining of the reactor. The effectiveness of the washing was checked by measuring the final pH of the washing waters, which was between 10 and 10.5.

Next, a barium exchange was carried out under operating conditions identical to those of Example 2 followed by washing and then drying at 80° C. for 2 h and finally activation at 250° C. for 2 h under a stream of nitrogen.

The degree of barium exchange of this adsorbent was 95% and its loss on ignition was 6.0%. The micropore volume measured using the Dubinin method by nitrogen adsorption at 77 K after vacuum degassing at 300° C. for 16 h was 0.256 $cm^3/g$.

A breakthrough test (frontal chromatography) was then carried out on these adsorbents in order to determine their effectiveness. The amount of adsorbent used for these tests was about 76 g.

The operating method and the composition of the charge were identical to those of Example 1.

The breakthrough results are given in the table below.

The selectivity of para-xylene relative to meta-xylene is calculated by mass balance.

| Nature of the solid | $LOI^{(1)}$ at 900° C. | $Temp^{(2)}$ | $Capacity^{(3)}$ | $\alpha_{pX/mX}$ $selectivity^{(4)}$ | Theoretical tray height |
|---|---|---|---|---|---|
| BaX | 6.0% | 175° C. | 0.194 | 3.33 | 2.26 |

The mechanical strength was also measured using the method given in the description of the invention. The pressure needed to obtain 0.5% fines was 2.40 MPa.

It may be seen that the adsorbents according to the invention combine, simultaneously, a selectivity, a mass transfer and a mechanical strength that are improved over the adsorbents of the prior art.

The invention claimed is:

1. An agglomerated zeolitic adsorbent based on zeolite X crystals with a number-average diameter of 1.7 µm or less, an Si/Al atomic ratio of 1.15<Si/Al≦1.5, at least 90% of the exchangeable cationic sites of which are occupied either by barium ions alone or by barium ions and potassium ions, the exchangeable sites occupied by potassium comprising up to ⅓ of the exchangeable sites occupied by barium+potassium, and an inert binder, said adsorbent having a Dubinin volume of 0.245 $cm^3/g$ or higher and a mechanical strength of 2 MPa or higher.

2. The adsorbent according to claim 1, wherein the Dubinin volume of which is 0.250 $cm^3/g$ or higher.

3. The adsorbent according to claim 1, wherein the Dubinin volume is 0.253 $cm^3/g$ or higher.

4. The adsorbent according to claim 1, wherein 95% or higher of the exchangeable sites are occupied by barium ions alone or by barium ions and potassium ions.

5. The adsorbent according to claim 1, wherein the loss on ignition, measured at 900° C., is between 4.0 and 7.7%.

6. The adsorbent according to claim 1, wherein the number-average diameter of the crystals of between 0.1 and 1.7 μm.

7. The adsorbent according to claim 1, wherein the number-average diameter of the crystals is between 0.1 and 1.6 μm.

8. The adsorbent according to claim 1, wherein the adsorbent has an Si/Al atomic ratio ranging from 1.2 to 1.3.

9. A process for obtaining an adsorbent as defined in claim 1, comprising:
- a) agglomerating zeolite X powder with a number-average diameter of 1.7 μm or less, having an Si/Al atomic ratio of $1.15<Si/Al\leqq1.5$, with a binder containing at least 80% by weight of zeolitizable clay and optionally a source of silica, forming, then drying and calcinating; thereafter,
- b) zeolitizating with an alkaline basic solution; thereafter,
- c) replacing at least 90% of the exchangeable sites of the zeolite X with barium, followed by washing and drying of the product thus treated;
- d) optionally replacing of up to 33% of the exchangeable sites of the zeolite X with potassium, followed by washing and drying of the product thus treated; and
- e) activating said zeolite X.

10. The process according to claim 9, wherein the number-average diameter of the crystals is between 0.1 and 1.7 μm.

11. The process for obtaining adsorbents according to claim 10, wherein the number-average diameter of the crystals is between 0.1 and 1.6 μm.

12. The process according to claim 9, wherein the Si/Al atomic ratio is between 1.2 and 1.3.

13. The process according to claim 9, wherein step e) is a thermal activation carried out at a temperature of 200 to 300° C.

14. The process according to claim 9, wherein the alkaline solution of step b) has a concentration of at least 0.5M.

15. A method of recovering para-xylene from aromatic $C_8$ isomer fractions in liquid phase, comprising adsorbing the para-xylene with an adsorbent according claim 1 in the presence of a desorbent.

16. The method of recovering para-xylene according to claim 15, wherein said zeolitic adsorbent is operating in a simulated moving bed flow.

17. The method of recovering para-xylene according to claim 16, wherein said zeolitic adsorbent is operating in a simulated counter-current flow.

18. The method of recovering para-xylene according to claim 16, wherein said zeolitic adsorbent is operating in a simulated co-current flow.

19. A method of recovering para-xylene from aromatic $C_8$ isomer fractions in the gas phase, comprising adsorbing para-xylene with an adsorbent according to claim 1 in the presence of a desorbent.

20. The method of recovering para-xylene according to claim 15, in which wherein the desorbent is toluene or para-diethylbenzene.

21. The adsorbent according to claim 1, wherein the loss on ignition, measured at 900° C., is between 5.2 and 7.7%.

22. The process according to claim 9, wherein step d) is carried out before step c).

23. The process according to claim 9, wherein step d) is carried out simultaneously step c).

24. The method of recovering para-xylene according to claim 19, wherein the desorbent is toluene or para-diethylbenzene.

25. The adsorbent according to claim 1, wherein the adsorbent was agglomerated with an inert binder containing at least 80% by weight of zeolitizable clay and optionally a source of silica.

* * * * *